US010239476B2

(12) United States Patent
Greer et al.

(10) Patent No.: US 10,239,476 B2
(45) Date of Patent: Mar. 26, 2019

(54) SYSTEM FOR INHIBITING OPERATION OF A VEHICLE-BASED DEVICE WHILE THE VEHICLE IS IN MOTION

(71) Applicant: LIPPERT COMPONENTS, INC., Elkhart, IN (US)

(72) Inventors: Christopher Greer, Syracuse, IN (US); Zachary Inbody, Elkhart, IN (US); Jeffrey Albrecht, Goshen, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 14/578,932

(22) Filed: Dec. 22, 2014

(65) Prior Publication Data

US 2015/0175102 A1 Jun. 25, 2015

Related U.S. Application Data

(60) Provisional application No. 61/919,871, filed on Dec. 23, 2013.

(51) Int. Cl.
*B60R 16/03* (2006.01)
(52) U.S. Cl.
CPC ................... *B60R 16/03* (2013.01)
(58) Field of Classification Search
None
See application file for complete search history.

(56) References Cited

U.S. PATENT DOCUMENTS

| 3,693,167 | A | * | 9/1972 | Teurnier | G06F 7/62 708/672 |
| 5,272,386 | A | * | 12/1993 | Kephart | H02J 9/002 307/10.1 |
| 6,400,042 | B1 | * | 6/2002 | Winner, Jr. | B60R 25/045 180/287 |
| 6,857,496 | B2 | * | 2/2005 | Williams | B60R 25/02 180/287 |
| 6,885,290 | B2 | * | 4/2005 | Tsuji | B60R 25/04 340/426.1 |
| 7,590,403 | B1 | * | 9/2009 | House | H04W 52/0232 455/343.2 |
| 7,792,328 | B2 | * | 9/2010 | Albertson | B60W 40/09 340/576 |
| 9,139,123 | B2 | | 9/2015 | Cepynsky | |
| 2005/0029873 | A1 | * | 2/2005 | Lewis | H02M 5/293 307/140 |
| 2005/0133754 | A1 | * | 6/2005 | Parsons | E03D 1/36 251/129.17 |
| 2009/0233735 | A1 | * | 9/2009 | Savarese | A63B 71/0669 473/407 |

(Continued)

FOREIGN PATENT DOCUMENTS

WO WO 2005075264 A1 * 8/2005 ......... B60R 25/1003

*Primary Examiner* — Jean Paul Cass
(74) *Attorney, Agent, or Firm* — Nixon & Vanderhye P.C.

(57) ABSTRACT

A system for inhibiting operation of a vehicle-based device while the vehicle is in motion includes a motion sensor, a timer, and a time delay override switch in communication with a control circuit. The control circuit selectively outputs one or more enable and/or inhibit signals based on the states of the motion sensor and timer. The time delay override switch can be actuated to place the timer into a timed out state from a timing state.

18 Claims, 1 Drawing Sheet

(56) References Cited

U.S. PATENT DOCUMENTS

| | | | |
|---|---|---|---|
| 2010/0030382 A1* | 2/2010 | Shalat | B25J 13/087 |
| | | | 700/258 |
| 2011/0037584 A1 | 2/2011 | Kenny et al. | |
| 2012/0224062 A1* | 9/2012 | Lacoste | G01C 21/365 |
| | | | 348/148 |
| 2015/0054639 A1* | 2/2015 | Rosen | G06K 9/00785 |
| | | | 340/439 |
| 2016/0091292 A1* | 3/2016 | Hol | G01C 21/16 |
| | | | 702/141 |
| 2016/0125891 A1* | 5/2016 | Nyshadham | G10L 21/02 |
| | | | 704/270 |

\* cited by examiner

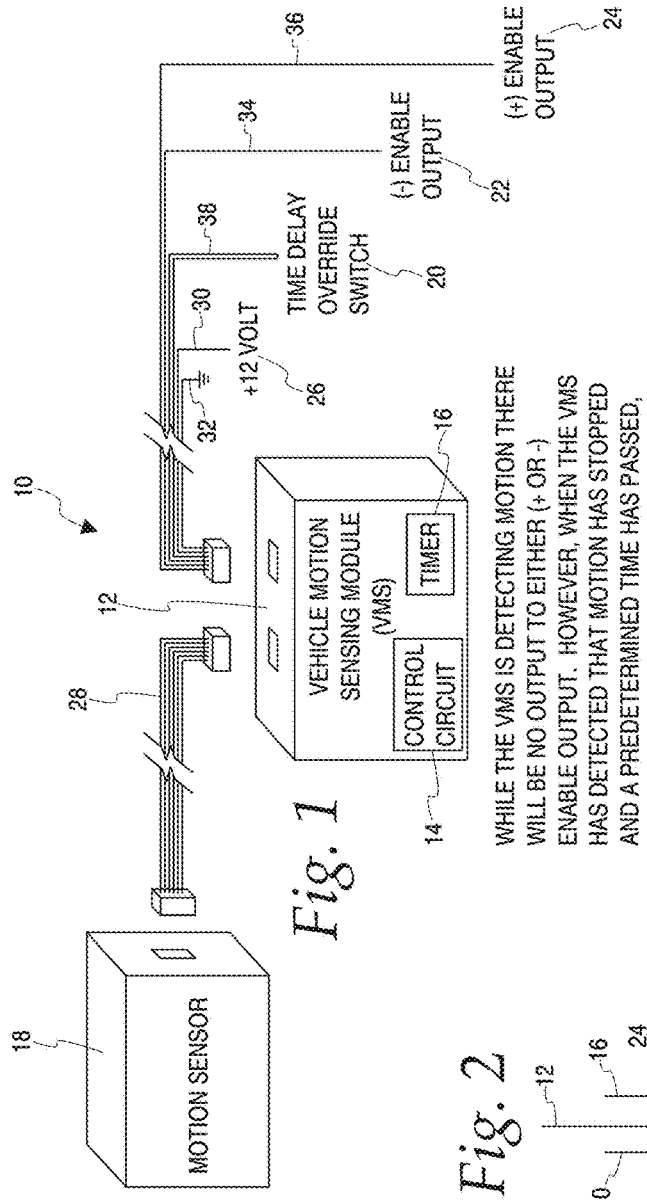

SYSTEM FOR INHIBITING OPERATION OF A VEHICLE-BASED DEVICE WHILE THE VEHICLE IS IN MOTION

CROSS-REFERENCE TO RELATED APPLICATION

This application claims benefit of the filing date of U.S. Provisional Patent Application No. 61/919,871, filed on Dec. 23, 2014, and incorporates by reference the disclosure thereof in its entirety.

BACKGROUND AND SUMMARY OF THE DISCLOSURE

Travel trailers and other towed vehicles may include one or more power-operated devices or accessories, for example, power-operated awnings, leveling jacks and slide-outs, among others (sometimes referred to herein, individually or collectively, as "devices" or "accessories"), as would be understood by one skilled in the art. Such devices typically can be operated using controls mounted on the vehicle or on the devices themselves, a tethered remote control connected to the vehicle or the devices themselves, or a wireless remote control that could be carried in an operator's pocket, the towed vehicle, or a tow vehicle.

Some such accessories, for example, awnings, leveling jacks and slide-outs, are intended to be deployed only when the vehicle is parked, and not when the towed vehicle is in motion. One way to preclude inadvertent operation of an accessory is to make its controls inaccessible to an operator while the vehicle is in motion. Vehicle-mounted controls, device-mounted controls, and tethered remote controls typically would be inaccessible to an operator with the towed vehicle in motion. As such, it is unlikely that an accessory would be inadvertently operated using these types of controls while the vehicle is in motion. A wireless remote control, however, could be inadvertently actuated while being carried in an operator's pocket or in a tow vehicle while the vehicle is in motion, resulting in unintended deployment of an accessory with the vehicle in motion.

Another way to preclude inadvertent operation of an accessory is to disable it while the vehicle is in motion. An accessory can be readily disabled by disconnecting it (or its power or control circuit) from its source of operating power by opening a circuit breaker or power switch prior to moving the vehicle. Opening a circuit breaker or switch, however, is a deliberate task that the vehicle operator might forget or otherwise fail to perform each time the vehicle is moved.

This disclosure describes and illustrates an exemplary system adapted to selectively output one or more enable and/or inhibit signals that can be provided to an accessory or to its power or control circuits in order to selectively enable and/or disable the accessory's operation. The system includes a motion sensor that determines whether or not the vehicle is in motion, a timer, a time delay override switch and a control circuit that selectively outputs an enable signal based on the state of the motion sensor, timer, and/or time delay override switch, as set forth in the claims appended hereto.

BRIEF DESCRIPTION OF THE DRAWINGS

FIG. 1 is a block diagram of an illustrative system 10 for selectively enabling and/or inhibiting operation of a vehicle-based device while the vehicle is in motion; and FIG. 2 is a schematic representation of a control circuit 14 and its inputs and outputs;

DETAILED DESCRIPTION OF THE DRAWINGS

FIG. 1 is a block diagram of an illustrative system 10 for selectively inhibiting and/or enabling operation of a vehicle-based device (sometimes referred to herein as a "controlled device") while the vehicle is in motion. System 10 typically would be disposed on the vehicle bearing the controlled device. The vehicle might be, for example, a travel trailer, and the controlled device might be, for example, a power operated awning, a leveling system, a slide out, or another controlled device or accessory. Such controlled devices typically are powered electrically or hydraulically (for example, using an electrically-operated hydraulic pump) and controlled electrically or electronically.

System 10 includes a vehicle motion sensing module 12 having a control circuit 14 that receives inputs from a timer 16, a motion sensor 18, and a time delay override switch 20. Control circuit 14 processes these inputs and selectively provides one or more outputs that enable and/or disable a controlled device or function, as discussed further below. The inputs to and outputs from control circuit 14 are illustrated in FIG. 2.

Vehicle motion sensing module 12 could be embodied as a panel or housing bearing or containing at least control circuit 14. The panel or housing typically would be located on the towed vehicle. Vehicle motion sensing module 12 also could bear or contain one or more of timer 16, motion sensor 18, and time delay override switch 20. Alternatively, one or more of timer 16, motion sensor 18, and time delay override switch 20 could be located remotely from vehicle sensing module 12.

Control circuit 14 is operably coupled to timer 16, motion sensor 18, and time delay override switch 20 via wired or wireless connections. In an illustrative embodiment, at least time delay override switch 20 is operably coupled to control circuit 14 via a wired electrical connection 38. FIG. 1 shows cable 28 coupling motion sensor 18 to control circuit 14 disposed in vehicle motion sensing module.

Control circuit 14 also is operably coupled to first and second enable outputs 22, 24 via wired or wireless connections. Control circuit 14 includes control logic adapted to selectively provide enable and/or disable signals to one or more controlled devices via first and/or second enable outputs 22, 24. The control logic may be in the form of hardware or software. Control circuit 14 may include a microprocessor to run software-based control logic, as would be understood by one skilled in the art. Control circuit 14 may selectively tie either or both of first and second enable outputs 22, 24 to a logical high (for example, five volts or another reference potential) or a logical low (for example, ground or another reference potential), as would be understood by one skilled in the art. In an illustrative embodiment, control circuit 14 selectively ties one of first and second enable outputs 22, 24 to a logical high, and control circuit 14 selectively ties the other of first and second enable outputs 22, 24 to a logical low.

Control circuit 14 is connected to a power source 26 via power line 30. Power source 26 could be, but need not be, a 12 VDC source. Power source 26 could be dedicated to system 10 or it could be a power source provided for the vehicle generally. Control circuit 14 also is connected to a ground or other reference potential via ground connection 32.

Motion sensor 18 may be embodied as any suitable structure configured to determine whether a vehicle it is associated with is in motion or at rest and capable of conveying that information, directly or indirectly, to control circuit 14 as an electrical signal. For example, without limitation, motion sensor 18 could be embodied as a GPS unit, an accelerometer, a radar unit (for example, a ground radar unit), an optical sensor, or a gyroscope. Alternatively, motion sensor 18 could be embodied as a structure configured to determine whether at least one of the vehicle's wheels is turning. For example, without limitation, motion sensor 18 could be embodied as a Hall effect sensor having a chassis-mounted transducer and a wheel-mounted magnet. Any of the foregoing structures, among others, could determine whether the associated vehicle is in motion or at rest.

Motion sensor 18 provides an output in an in-motion state (an "in-motion signal") when motion sensor 18 determines that the vehicle is in motion. Motion sensor 18 provides an output in an at-rest state ("an at-rest signal") when motion sensor 18 determines that the vehicle is at rest. The in-motion and at-rest signals could be logical high or logical low signals, as desired and as would be understood by one skilled in the art.

Timer 16 can be embodied in any suitable form. For example, timer 16 could be embodied as a discrete electro-mechanical timer, a solid state timer, or the like. Alternatively, timer 16 could be embodied as an integral portion of control circuit 14 or an adjunct thereto in hardware or software form.

Timer 16 is operable between a timing state and a timed out state, as discussed further below. Timer 16 is adapted to receive a timer start signal indicating that timer 16 should enter the timing state. The timer start signal could be provided by control circuit 14 or another source. In an illustrative embodiment, control circuit 14 provides timer 16 with a timer start signal when control circuit 14 determines that the output from motion sensor 18 has transitioned from an in-motion state to an at-rest state. Timer 16 also is adapted to provide an output to control circuit 14 indicative of whether timer 16 is in the timing state or the timed out state. Timer 16 further is adapted to receive a time delay override signal indicating that timer 16 should enter the timed out state. The time delay override signal could be provided by control circuit 14 or another source. In an illustrative embodiment, control circuit 14 provides timer 16 with a time delay override signal in response to actuation of time delay override switch 20, as discussed further below. In another embodiment, time delay override switch 20 could directly provide a time delay override signal to timer 16.

Timer 16 normally is in the timed out state, and normally outputs a signal (or lack thereof) indicating that it is in the timed out state. Upon receipt of a timer start signal, timer 16 enters the timing state and outputs a signal (or lack thereof) indicating that it is in the timing state. Once timer 16 enters the timing state, it remains in the timing state for a predetermined duration (sometimes referred to herein as a "countdown period"). The countdown period may be any suitable, pre-determined duration. For example, the countdown signal duration could be set for ten to twenty minutes, or a longer or shorter duration. The countdown period could be restarted at any time if timer 16 receives a new timer start signal. A new timer start signal could be provided, for example, if the output of motion sensor 18 were to again transition from the in-motion state to the at-rest state. This could occur, for example, if the vehicle upon which motion sensor 18 is mounted were to begin moving and then stop moving. Timer 16 returns to the timed out state upon expiration of the countdown period or upon receipt of a time delay override signal.

Time delay override switch 20 could be contained within or on vehicle motion sensing module 12. Alternatively, it could be located elsewhere. For example, time delay override switch could be located anywhere on the vehicle associated with system 10. Time delay override switch 20 could be embodied as any suitable form of electro-mechanical or solid state switch. For example, time delay override switch 20 could be a pushbutton, rocker or key switch that is switchable between a normal state and an override state. In an illustrative embodiment, time delay override switch 20 is a momentary-contact switch that must be actuated by a user to place it in the override state and that returns to the normal state when released. Alternatively, time delay override switch 20 could be a solid state switch or sensor having an associated control circuit adapted to discern that time delay override switch 20 is in a normal state when it is not touched and in an override state when it is touched. In an illustrative embodiment, time delay override switch 20 is adapted to provide a signal indicative of its state to control circuit 14 or timer 16.

In other embodiments, control circuit 14 could provide more or fewer enable outputs. When control circuit 14 receives an in-motion signal from motion sensor 18 indicating that motion sensor 18 is sensing motion, the enable outputs of control circuit 14 are in an inhibit state, regardless of the state of timer 16 and timer override switch 20. In this context, the term "inhibit state" refers to an enable output state that passively inhibits operation of a connected, controlled device by not providing an enable signal thereto, or an enable output state that actively inhibits operation of the connected, controlled device by providing an inhibit signal thereto.

When control circuit 14 receives an input from motion sensor 18 indicating that motion sensor 14 is not sensing motion and an input from timer 16 indicting that timer 16 is in a timing state, the enable outputs of control circuit 14 are in an inhibit state. As discussed above, timer 16 can be transitioned to the timed out state from the timing state by transitioning timer override switch 20 from the normal state to the override state. Once reset in this manner, timer 16 remains in the timed out state until the output of motion sensor 18 again transitions from the in-motion state to the at-rest state as might occur if the vehicle associated with system 10 were to be moved and then stopped.

When control circuit 14 receives inputs indicating that motion sensor 14 is not sensing motion and that timer 16 is in the timed out state (whether timer 16 has timed out at the end of the countdown period or has been reset by actuation of timer override switch 20), the enable outputs of control circuit 14 are in an enable state. In this context, "enable state" refers to an enable output state that actively enables operation of a connected, controlled device by providing an enable signal thereto, or an enable output state that passively inhibits operation of the connected, controlled device by not providing an enable signal thereto.

As suggested above, if the enable outputs of control circuit 14 are in the enable state and motion sensor 18 then outputs a signal (or lack thereof) indicating that the vehicle associated with system 10 has begun moving, the enable outputs of control circuit 14 transition to the inhibit state. If a controlled device is in operation at the time the enable outputs transition from the enable state to the inhibit state, the operation of the controlled device could be immediately terminated. Alternatively, the controlled device could include control logic configured to determine whether to immediately terminate operation of the controlled device, to allow the controlled device to complete the operation it was engaged in when the enable signal thereto was terminated and then lock out further operation of the controlled device until an enable signal is reestablished, or to act in another manner.

First and/or second enable signals 22 and 24 can be provided to one or more controlled devices or accessories via wired or wireless electrical connections or couplings 34, 36, respectively. Such controlled devices or accessories may have integral control logic receiving the enable signals and further enabling or inhibiting operation of the devices or accessories in response thereto.

One skilled in the art would recognize that various changes and modifications could be made to the embodiments described herein without departing from the scope of the appended claims.

The invention claimed is:

1. A system for selectively enabling and/or inhibiting operation of a controlled device disposed on a non-motorized vehicle, said system comprising:
   a motion sensor adapted to determine whether said vehicle is in motion or at rest, said motion sensor further adapted to provide an output in an in-motion state when said motion sensor determines said vehicle to be in motion and in an at-rest state when said motion sensor determines said vehicle to be at rest;
   a timer operable between a timing state and a timed-out state, said timer adapted to provide an output in a timing state when said timer is in said timing state and in a timed out state when said timer is in said timed-out state;
   a time delay override switch operable to transition said timer from the timing state to the timed-out state; and
   a control circuit operatively coupled to said motion sensor and said timer;
   said control circuit adapted to receive said output from said motion sensor and said output from said timer;
   said control circuit adapted to place said timer into said timing state when said output from said motion sensor transitions from said in-motion state to said at-rest state; and
   said control circuit adapted to: (a) output an inhibit signal when said motion sensor output is in said in-motion state, and to (b) output said inhibit signal or another inhibit signal when said motion sensor output is in said at-rest state and said timer output is in said timing state.

2. The system of claim 1 further comprising said controlled device, said controlled device operatively coupled to said control circuit, and said controlled device adapted to receive said inhibit signal from said control circuit.

3. The system of claim 2, wherein operation of said controlled device is inhibited when said controlled device receives said inhibit signal from said control circuit.

4. The system of claim 1 wherein said control circuit further is adapted to output an enable signal when said motion sensor output is in said at-rest state and said timer output is in said timed-out state.

5. The system of claim 4 further comprising said controlled device, said controlled device operatively coupled to said control circuit, and said controlled device adapted to receive said inhibit and enable signals from said control circuit.

6. The system of claim 5 wherein operation of said controlled device is enabled when said controlled device receives said enable signal from said control circuit.

7. The system of claim 4 wherein said timer output has entered said timed out state after having been in said timing state for a predetermined duration.

8. The system of claim 4 wherein said timer output has entered said timed out state in response to said time delay override switch having been momentarily placed in said override position.

9. The system of claim 1 wherein said override switch is hardwired to said control circuit.

10. The system of claim 1 wherein said override switch is key-operated.

11. The system of claim 1 further comprising said vehicle.

12. The system of claim 11, said vehicle having living quarters, wherein said override switch is inaccessible from said living quarters.

13. The system of claim 11 further comprising said controlled device.

14. The system of claim 13 wherein said controlled device comprises an electrically-operated device.

15. The system of claim 13 wherein said controlled device comprises a power or control circuit for operating an electrically-operated device.

16. The system of claim 1 wherein said timing state has a predetermined duration of at least one minute.

17. The system of claim 1 wherein said timing state has a predetermined duration of at least about twenty minutes.

18. A system for selectively enabling and/or inhibiting operation of a controlled device disposed on a non-motorized vehicle, said system comprising:
   a motion sensor adapted to determine and to provide an output indicative of whether said vehicle is in motion or at rest;
   a timer operable to enter a timing state for a predetermined amount of time when said motion sensor indicates that the vehicle is at rest immediately after said motion sensor output has indicated that the vehicle is in motion, to enter a timed-out state after having been in the timing state for said predetermined amount of time, and to provide an output indicative of whether the timer is in the timing state or the timed-out state;
   a time delay override switch operable to transition said timer from the timing state to the timed-out state; and
   a control circuit operatively coupled to said motion sensor and said timer;
   said control circuit adapted to receive said output from said motion sensor and said output from said timer; and
   said control circuit adapted to: (a) output an inhibit signal when said motion sensor output indicates that the vehicle is in motion; and (b) output said inhibit signal or another inhibit signal when said motion sensor indicates that the vehicle is at rest and said timer is in said timing state.

* * * * *